(12) United States Patent
Moriyasu

(10) Patent No.: US 6,853,103 B2
(45) Date of Patent: Feb. 8, 2005

(54) LOW PROFILE PUSH-PULL MAGNETIC VIBRATING APPARATUS

(76) Inventor: Hiro Moriyasu, 1314 SW. 57th Ave., Portland, OR (US) 97221

( * ) Notice: Subject to any disclaimer, the term of this patent is extended or adjusted under 35 U.S.C. 154(b) by 0 days.

(21) Appl. No.: 10/355,398

(22) Filed: Jan. 31, 2003

(65) Prior Publication Data

US 2004/0150277 A1 Aug. 5, 2004

(51) Int. Cl.[7] .................................................. H02K 7/10
(52) U.S. Cl. ............................. 310/81; 310/15; 310/36
(58) Field of Search .............................. 310/81, 12, 13, 310/14, 26, 15, 36, 20

(56) References Cited

U.S. PATENT DOCUMENTS 3,612,967 A * 10/1971 Lee ............................ 318/123
5,058,173 A * 10/1991 Ashworth .................... 381/152
5,184,037 A * 2/1993 Kobayashi et al. ........... 310/26
5,945,749 A * 8/1999 Li .................................. 310/15
6,373,153 B1 * 4/2002 Hazelton et al. .............. 310/12
6,530,756 B2 * 3/2003 Morita et al. ................ 417/417

* cited by examiner

Primary Examiner—Tran Nguyen
Assistant Examiner—Leda Pham
(74) Attorney, Agent, or Firm—Dellett & Walters

(57) ABSTRACT

An ultra-low profile vibrating transducer, particularly suited for floor mat and ultra thin vibrating pad and multimedia tactical feedback applications, using an "I" core coil in the center and permanent magnets positioned at both ends of the "I" core to create balanced push-pull vibrating actions. Mounting methods to effectively transfer energy to the users while withstanding user's body weight. "I" core coil may be driven by AC power, pulsed and/or DC power or audio power. Elastomeric supports are configured to provide rotational leverage action to further enhance the vibrating effectiveness.

18 Claims, 7 Drawing Sheets

TOP VIEW

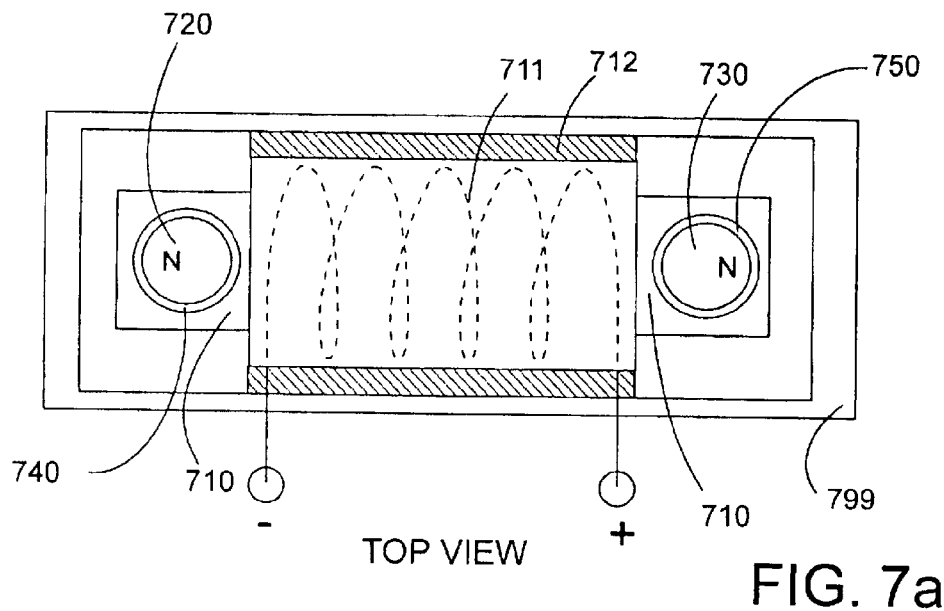
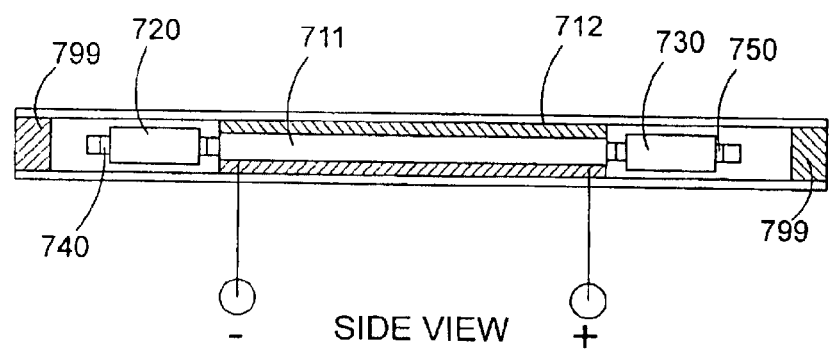
FIG. 7a
FIG. 7b

LOW PROFILE PUSH-PULL MAGNETIC VIBRATING APPARATUS

BACKGROUND OF THE INVENTION

A vibrating apparatus to be used as vibrating transducer for low profile floor mat application must meet two major obstacles. One, it must be low profile and, second, it must withstand direct body weight directly above such device without collapsing.

Various vibrating apparatuses, using prior arts, have been used in vibrating massaging devices. Massage pads typically contain eccentric small motors sandwiched between the top soft foam and bottom soft foam to create vibrating massage action to a user. While such vibrating pads are effective in seat cushion format, they are not well suited to withstand body weight as in a floor mat application.

Geared rotating cam action motors are used for footrest applications. However, they require high mechanical profile and are not suited for a low profile application.

A relay type vibrator typically has a magnetic coil and leaf spring-like magnetic laminate that is placed above the coil with an air gap. Since it requires stacking two magnetic laminates, it still faces height constraints and special means to reduce chatter noise when vibrators are compressed.

To achieve lower profile, vibrator transducer apparatus for floor application several requirements must be met.

SUMMARY OF THE INVENTION

An ultra-low profile vibrating transducer, particularly suited for floor mat applications using an "I" core coil in the center and permanent magnets positioned at both ends of the "I" core to create balanced push-pull vibrating actions.

Mounting methods to effectively transfer energy to the users while withstanding user's body weight.

"I" core coil may be driven by AC power or DC power.

Elastomeric supports are configured to provide rotational leverage action to further enhance the vibrating effectiveness.

The objective of this invention is to provide a lateral low profile vibrating transducer that is thin enough to be incorporated within the thin floor mat, yet withstand the weight of a body.

Another objective is to overcome the vibrating element collapsing or chattering when body weight is applied on or in the vicinity of the vibrating element.

Yet another objective is to provide a lower vibration frequency (one half) than the conventional relay, solenoids or vibrating leaf type vibrator when it is operated with an AC power source.

And further, an important objective is to provide a distinctive push-pull vibrating action.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

BRIEF DESCRIPTION OF THE DRAWINGS

FIG. 7 illustrates use of floating magnet within core laminate;

DETAILED DESCRIPTION

Figure 1:
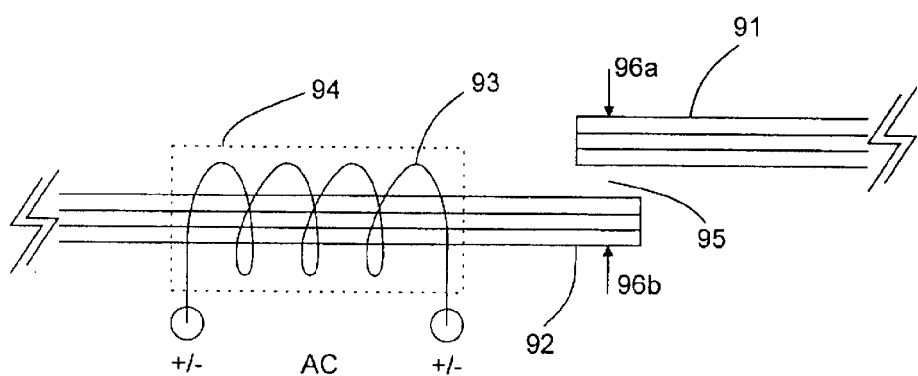
FIG. 1 illustrates a typical vibrator in accordance with the prior art.

FIG. 1 is an illustration of a conventional single ended pull only drive to create a vibrating motion. The conventional vibrating transducer, according to prior arts, typically creates only pull action regardless of positive or negative electrical drive to the coils.

Vibrators, according to prior art, are typically in the of a form of a relay coil and attached flexible lever or "C" core 92, with coil 93 and an "I" core laminate 91 attached to "C" core (not shown) to form complete magnetic field (not shown) with spring loaded or elastomer 95 (not shown) spacer between "C" core and "I" core.

While "C" & "I" core can cover a large area, several limitations exist. One fundamental limitation is when the electrical signal is applied. The magnetic forces 96a and 96b can only attract each end of the magnetic pole, producing only a contractive force.

When a signal is applied, either positive or negative, the cores pull toward each other and release when the signal is zero. Polarity of force is always attractive irrelevant to polarity of current. In the case of an AC drive to the coil, on each power cycle, the vibrating element will be pulled twice—once during the positive half cycle and released at the zero crossing and again during the negative half cycle and released again at the zero crossing at the end of cycle.

Thus, if a 60-hertz AC drive is applied, the vibrating element will vibrate at 120 hertz. There are several undesirable effects. First, lower frequencies allow building more inertia in the moving elements and produce a better vibrating efficiency. Second, twice the vibration frequency means potentially more undesirable noise emitted. Third, the single ended pull and release cycle is weaker than a push-pull force because some energy must be stored in the spring element.

Figure 2A:
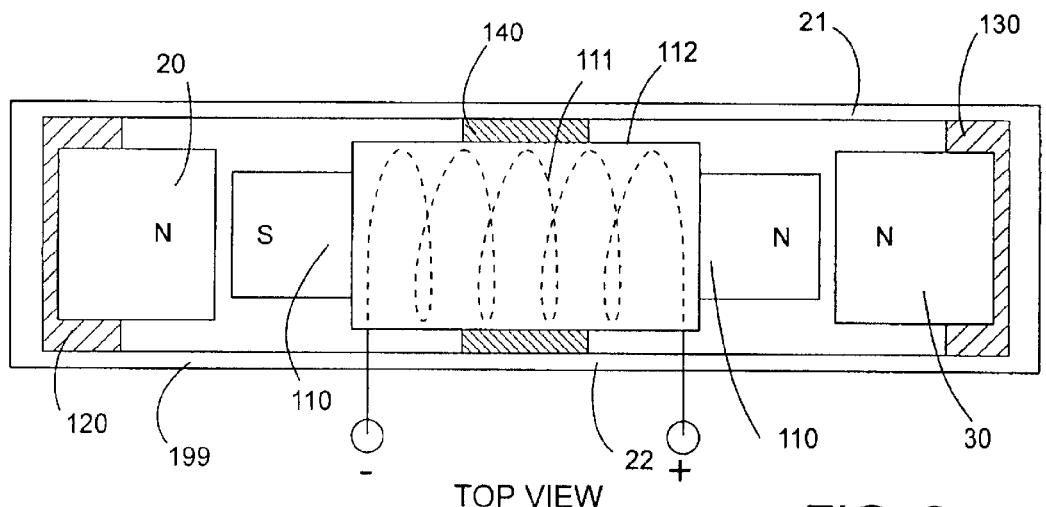
FIG. 2A–FIG. 2C illustrate basic design of a new low profile vibrator.

Therefore, a new approach is required to overcome these deficiencies, as described starting in FIG. 2A.

Figure 2B:
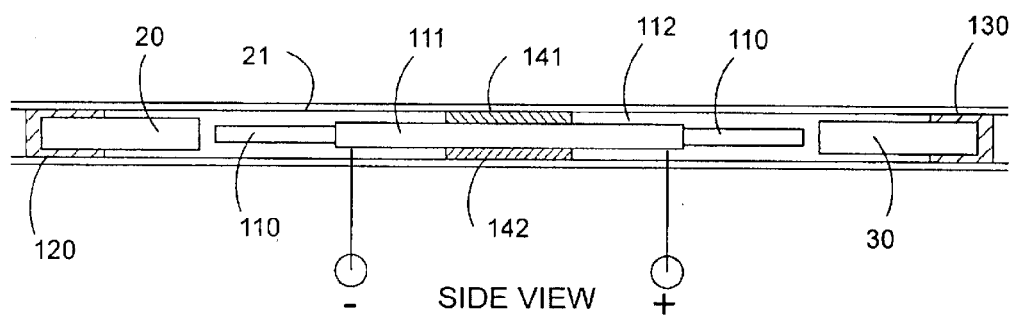

FIG. 2A (top view) and FIG. 2B (side view) illustrate conceptually the basic operation of the push-pull type electromagnetic vibrator.

An "I" core magnetic assembly is placed at the center and consists of "I" core laminate 110, coil 111, and encased by insulation 112 (tape or encapsulation); FIG. 2B shows how the coil assembly is supported by the elastic supports 141 and 142, and is placed between the upper protective cover 21 and base cover 22.

The permanent magnets 20 and 30 are placed at the outer end and are supported by elastomers 120 and 130 that are in position to maintain the proper air gap. The elastomers 120 and 130 also act as pivoting points, allowing the permanent magnets 20 and 30 to flex as shown in FIG. 2B.

Figure 2C:
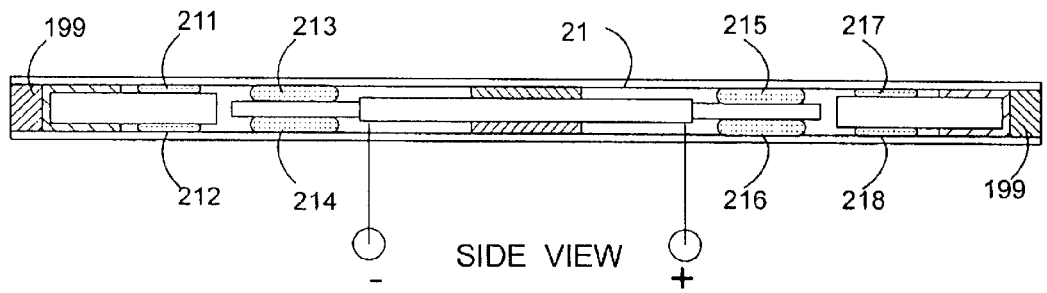

FIG. 2C shows the addition of several softer foam pieces 211, 212, 213, 214, 215, 216, 217 and 218. These act as to reduce the noise and prevent chattering.

The upper four foams 211, 213, 215 and 217 also provide for the transmission of the vibrational energy to the top cover 21. The lower soft foams 212, 214, 216, and 218 will act as cushions to reduce the noise and prevent chattering All of these components would typically be built into a frame 199 of semi-rigid material, to form a module to simplify the manufacturing process and protect the assembly inside.

Note that the soft foam pieces 211 to 218 and the frame 199 are shown in the FIG. 2c, however soft foams 211 to 218 are omitted from the most of the forth coming figures to avoid drawing clutter. It is understood such soft cushion foam will be utilized to reduce impact noise and provide effective and pleasing impact response to the user.

Proposed low profile configuration shown in the FIG. 2c will provide numerous opportunities in design flexibilities for not only for floor mat application but also thin profile vibrating pads and thin profile vibrating seat cushions.

Figure 3A:
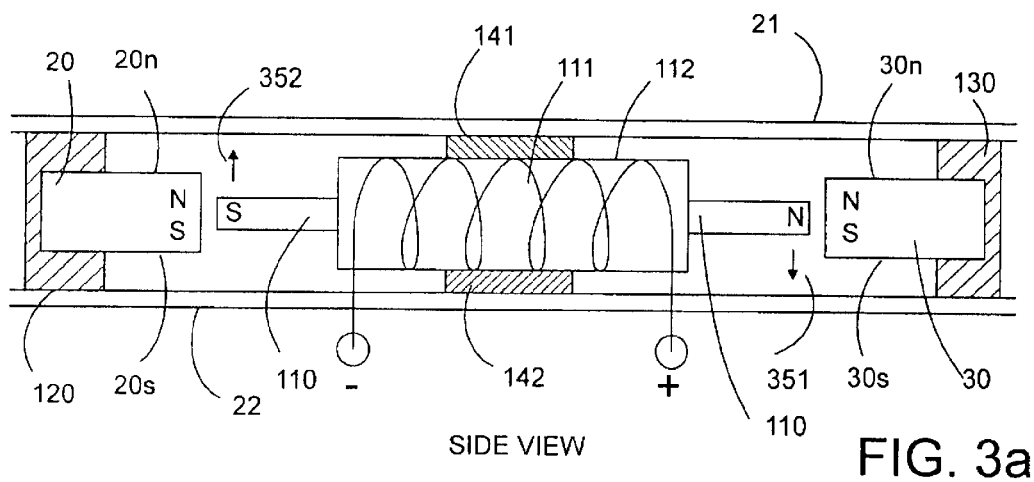
FIG. 3A–FIG. 3B are illustrations of push-pull action.
Figure 3B:
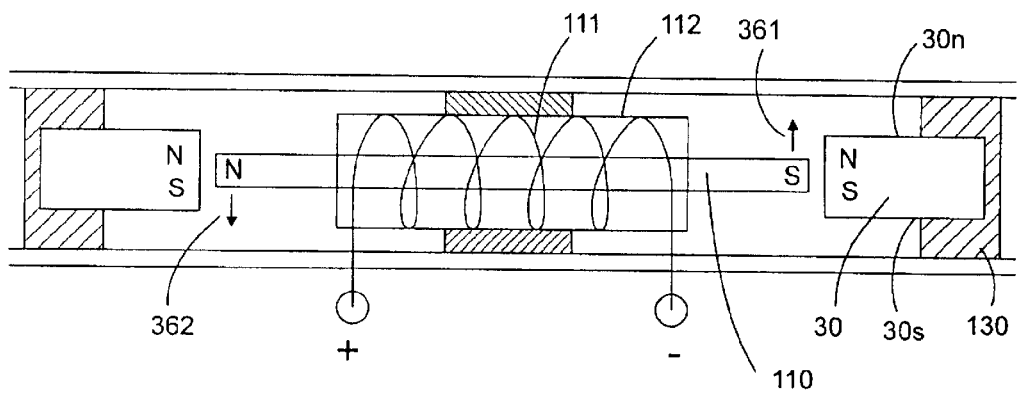

Using FIGS. 3a and 3b, examine the vibrating motion when an AC signal is applied to the "I" core coil 111. Assuming the first half cycle is positive, a magnetic south pole is created at the left side of the "I" core 110 and a magnetic north pole is created at the right side of the "I" core 110. These created magnetic poles interact with permanent magnets, 20 and 30 which have north poles on the top and south poles on the bottom. The generated pole interacts with the fixed poles to create forces 351 and 352 on the laminate and opposite forces (not shown) on the permanent magnets. These will create clockwise torques on the "I" core assembly 112 (pivoting at the central support elastomers 141 and 142) and both permanent magnets 20 and 30 (flexing with respect to their supporting elastomers 120 and 130).

FIG. 3b illustrates the situation when the AC signal is reversed. During the second half cycle of, which is negative, the magnetic field reverses, the forces 361 and 362 reverse, and the torques reverse to counter-clockwise.

In this device, the forces are opposite polarity during the two half cycles of the AC drive. Thus, the frequency of vibration is equal to the frequency of the AC drive. The reduced frequency is perceived as less noise than the 120-Hertz of prior art.

In addition, motion in both directions is being driven from the AC drive signal to create a push and pull drive. This is a major advantage over prior art—the forces are stronger and bidirectional as there is no spring effect to take some of the energy.

The lateral (adjacent) placement of the "I" core with the magnets eliminates the requirement of stacking two laminates. This further reduces the height of the vibrator to achieve an ultra thin vibrating transducer suitable for low profile floor mat application. It also avoids the chattering that occurs when stacked laminates are compressed by body weight.

Although AC signal is used to describe operation of vibrating action of the coil and the magnets, it is evident the drive signal may well be DC signal of various voltage or current, or pulsed DC signal. Unlike traditional eccentric weight driven dc motor, which require delay time to build up rotational speed, magnetic vibrator can respond in few milliseconds with application of pulsed DC signal.

The magnetic vibrating transducer may be operated by even with low frequency audio range signal or even sub-audio frequency drive to create true physical tactical sensation of environmental reaction. Traditionally, audio industry attempted to simulate physical vibration phenomena such as earthquake, bomb explosion, driving car vibration by speaker system of transmitting audio energy through air required huge power. It is noteworthy to point out proposed magnetic vibrating apparatus may be used to provide direct and efficient tactical physical feed back to the use's body.

Proposed push pull low profile vibrating transducer apparatus can provide all transducer requirement for vibrating floor mat, seat cushion or pad. Although it is not specifically illustrated, it is also possible to use in such application as in Joy stick, mouse, driving pedals to list a few.

Figure 4A:
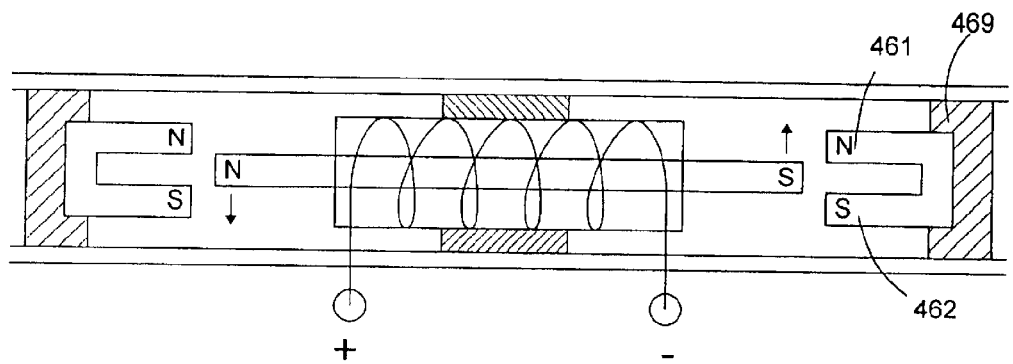
FIG. 4A–FIG. 4C illustrate alternate magnet arrangements.
Figure 4B:
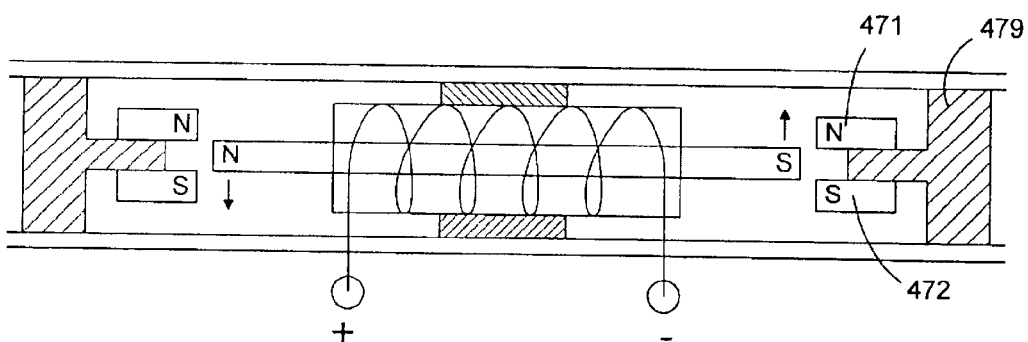
Figure 4C:
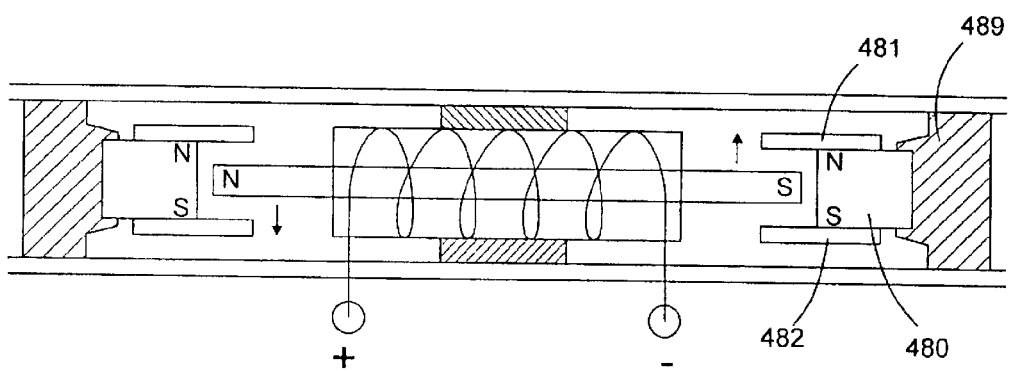

FIG. 4A–FIG. 4C illustrate various alternative methods of arranging permanent magnets to create the desired field. It will be evident to those skilled in the field of this art that such variations, and other similar ones, are included in the scope and spirit of this invention.

Figure 5:
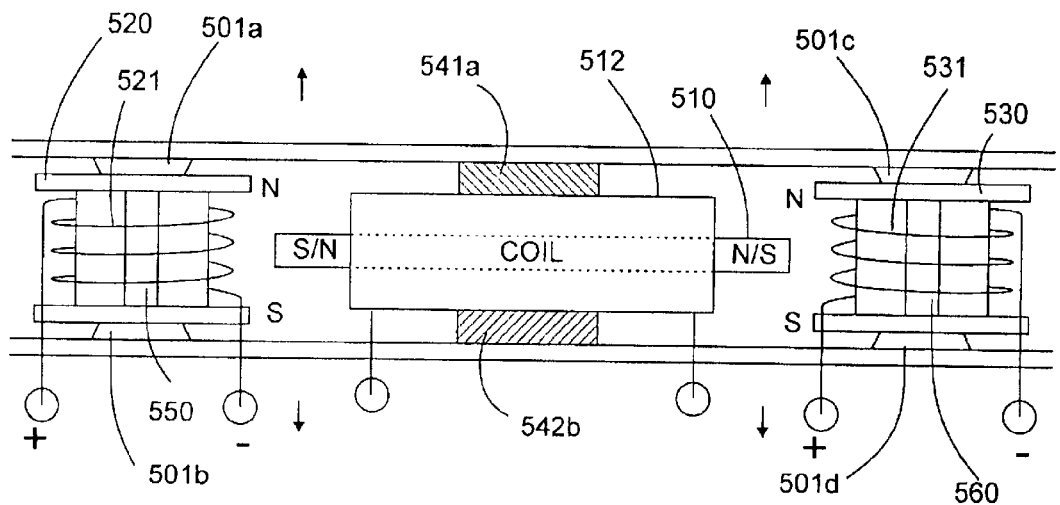
FIG. 5 illustrates use of DC electromagnets instead of permanent magnets'.

FIG. 5 illustrates the use of DC electromagnets 520 and 530 replacing the permanent magnets 20 and 30 used in the FIG. 2A.

The electromagnets 520 and 530 are constructed by a Ferro magnetic bobbin-like frame with coils 521 and 531 wound between top and bottom bobbin plates. It is well understood in the electronic field that when DC signal is applied to the coils 521 and 531 magnetic fields will cause upper plate to be a North Pole and bottom plate to be a South Pole.

In this operating mode, the DC magnets operate just like the permanent magnets, as explained in the FIG. 2A and FIG. 2B illustration. The excitation signal may be a constant DC supply or a rectified AC signal.

Having electromagnets has the added flexibility of creating special effects, since they may be driven with a low power, low voltage supply and various control circuits.

For example, adjusting the supplied voltage to the DC coil magnets may be used to control the vibrating strength. If the power is completely removed from the DC magnets, the vibrating action of "I" core magnetic laminate will essentially stop even if full power is applied to the "I" core coil. There will be no vibration because the AC driven "I" core will have no external magnetic field to interact with.

This means the DC magnet drive can be used to control proportional vibrating energy simply applying a varying DC voltage to the DC magnetic coil. Supplying pulsed signal to the DC coil magnet can create beat-like response of vibration. Applying slowly increasing and decreasing signal to the DC coils 520 and 530 will create soothing wave motion. Applying wave-like motion alternately to vibrator modules on the left and right side of the mat will further create a therapeutic good vibration.

It will be evident to those skilled in the field of this art to realize that the control signal to the DC magnets may be synchronized or sub-harmonically synchronized and rectified to create sub-harmonic vibrating patterns. These can be combined to create a multiplicity of positive going or negative going vibrating motions and are included in the scope and spirit of this invention.

Figure 6:
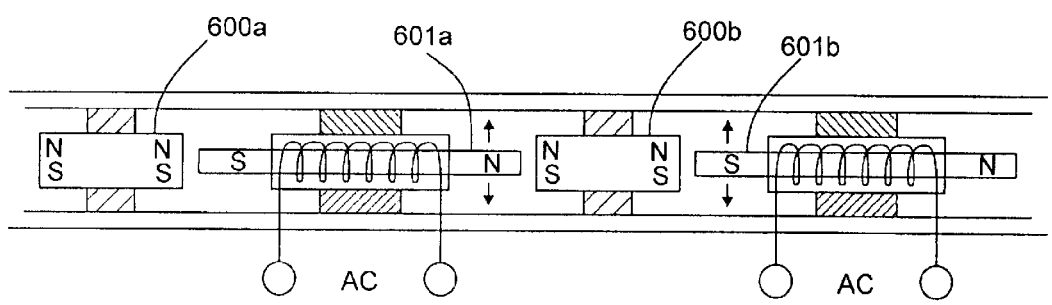
FIG. 6 illustrates cascading (merging) adjacent vibrators.

FIG. 6 shows the cascading of multiple "I" core magnetic assemblies 601a and 601b and permanent magnets 600a and 600b.

It is evident that if any vibrating member is forced to stop due to an unusually heavy weight overload, the magnetic vibrating force is coupled to the adjacent moving vibrating element, therefore the vibrating sensation is felt by the person standing on the low profile mat.

Those skilled in the art will appreciate that various possibilities of fastening and supporting elastomer may be accommodated. For example, the elastomers could be replaced with foam rubber, small air bladders, or springs. Such variation is covered in the scope and spirit of the present invention.

It will be further evident to those skilled in the field of this art that in all figures of the present invention, the "I" core and permanent magnets are illustrated with elastomeric supports. However, either the "I" core or the permanent magnets, but not both, may be mounted rigidly to the mat. For example, the "I" core assembly could be completely encapsulated between upper protective cover and lower base cover in order to totally protect the coil from heavy weight damage.

FIG. 7A illustrates the top view of another embodiment of the magnetic vibrator.

FIG. 7B shows the cross section of a magnetic vibrator based on FIG. 7A. FIG. 7A shows two magnetic round discs magnets 720 and 730 inserted within each end of the "I" core laminate 710. Each magnet has orientation of north pole at the top side of the round disc magnets 720 and 750 and south pole at the bottom side of each magnet. "I" core 710 has circular cutout to accommodate the round disc magnets 720 and 730 at each end. Cylinder-like isolating spacer 740 and 750 which are non magnetic are inserted between opening of "I" core laminate 710 at two round disc permanent magnets. At each side when the signal is applied to the coil 711, it will create north pole on the right side (and south pole on the left) "I" core laminate 710. The round magnet 730 having the north pole at the top and the south pole at the bottom will force "I" laminate downward.

Likewise the left side of the "I" core laminate and round disc magnet will act and react thus causing the left side of the "I" core laminate to deflect upward and the disc 720 to be forced downward. Out side frame 799 acts as frame to contain the magnetic vibrator assembly.

FIG. 7B illustrates the simplified side view of FIG. 7A. The "I" core laminate having coil 711 with supporting elastomer 712 with round magnetic disc 720 and 730. Isolation cylinders 740 and 750 are inserted between the round magnetic disc 720 and 730 as a spacer that allows the round magnetic discs to vibrate upward or downward.

The vibrating magnetic vibrator may be encased by the outside frame 799 and inserted between the top cover (not labeled) and the bottom cover (not labeled). Still referring to the FIG. 7B space above and below the round magnetic discs are shown with air space for the purpose of simplifying the illustration, however, noise reducing soft foam-like elastomatic materials (not shown) may be inserted.

If "I" core laminate is fastened solidly to the frame 799 it may be evident that the two round magnetic discs will be still be free to pop up on one side and pop down on the other side.

In the embodiments illustrated above, a soft tissue-like foam may be placed on the under side of the vibrating magnets to float the magnets up substantially to the upper surface such that higher energy is coupled to the upper side of the magnets and allows more space below the magnet such that minimum energy coupled to the floor. Further, upper and lower laminates to shield the vibrator from moisture, dust and the environmental interference with protection from wear and tear may also be provided.

If the "I" core laminate 710 is mounted with flexible elastomer 712 then the "I" core laminate will rock up and down respect to the center of the support elastomer.

In summary the proposed magnetic vibrating apparatus according to the present invention illustrates the advantage of the balanced push-pull action magnetic forces.

This invention not only achieved a lower profile by placing the vibrating coil and the moving magnets side by side but also provided design flexibility for the low profile construction. Having ability to withstand body weight, application usage extends to creating ultra thin vibrator-massager pads and or seat cover cushions. It will be apparent, to those skilled in the art, that many changes and modifications may be made without departing from the invention in its broader aspects; such changes and modification will fall within the true spirit and scope of the invention.

Proposed push pull low profile vibrating transducer apparatus can provide all transducer requirement for vibrating floor mat, seat cushion or pad. Possible application of magnetic vibrator also includes use in the Joy stick, mouse, driving pedals to list a few require quick spontaneous response. It will be evident to those who is skill in the art can appreciate that vibrating apparatus and concept proposed in the present invention may be utilized in number of tactical feed back element with minor modifications, such variation is covered with in the spirit and scope of the present invention.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

What is claimed is:

1. An ultra low profile vibrating apparatus, suitable for a floor mat or vibrating pad, comprising:
    a first magnet having first and second ends, supported by first elastomers to allow vibration up or down or rotation of the first magnet;
    a plurality of second magnets, having upper and lower faces, wherein said second magnets have opposite poles at the upper and lower faces thereof, wherein ones of said second magnets are placed adjacent to the first and second ends of the first magnet, with an air gap between said first and second ends of said first magnet and ones of said second magnets, wherein the second magnets are supported by a second, flexible elastomer which can act as supporting and pivoting point of the second magnets to allow flexing of said second magnets; and
    a supporting structure to maintain lateral spacing position of said first magnet and said second magnets.

2. An ultra low profile vibrating apparatus according to claim 1, further comprising:
    a weight bearing frame surrounding said first and second magnets and said first and second elastomers in order to substantially support vertical weight and to keep direct weight constricting vibration of said first and second magnets.

3. An ultra low profile vibrating apparatus according to claim 2, further comprising:
    a soft tissue-like foam placed on an under side of the first or second magnets to float the magnets substantially to an upper surface such that higher energy is coupled to the upper side of the magnets and allows more space below the magnet such that minimum energy is coupled to a lower surface.

4. An ultra low profile vibrating apparatus according to claim 3, further comprising upper and lower covers to shield the apparatus from moisture, dust and environmental interference with protection from wear and tear.

5. An ultra low profile vibrating apparatus, suitable for a floor mat or vibrating pad, comprising:
- at least two first magnets having first and second ends, comprising "I" core coil electromagnet laminates, supported by first elastomers to allow vibration up or down or rotation of the first magnet;
- a plurality of second magnets, having upper and lower faces, wherein said second magnets have opposite poles at the upper and lower faces thereof, wherein ones of said second magnets are placed adjacent to the first and second ends of the first magnets, with an air gap between said first and second ends of said first magnet and ones of said second magnets, wherein the second magnets are supported by a second, flexible elastomer which can act as supporting and pivoting point of the second magnets to allow flexing of said second magnets; and
- a supporting structure to maintain lateral spacing position of said first magnets and said second magnets
- a weight bearing frame surrounding said first and second magnets and said first and second elastomers in order to substantially support vertical weight and to keep direct weight constricting vibration of said first and second;
- a soft tissue-like foam placed on an under side of the first or second magnets to float the magnets substantially to an upper surface such that higher energy is coupled to the upper side of the magnets and allows more space below the magnet such that minimum energy is coupled to a lower surface;
- wherein said second magnets are placed at ends of said first magnets, spaced laterally in line to comprise multiple sets of first magnets and second magnets cascading alternately in a lateral direction such that activation from adjacent first magnets with opposing polarity creates rocking action of magnets, further creating truly balanced rotating vibrating action of magnets.

6. An ultra low profile vibrating transducer, particularly suitable for a floor mat or pad, comprising:
- an "I" core coil electromagnet, supported by elastomers to allow vibration up or down or rotation;
- a plurality of permanent magnets placed adjacent to each end of the "I" core electromagnets, with an air gap, wherein the permanent magnets have opposite poles at the upper and lower faces thereof; and
- an elastomeric supporting structure to maintain lateral spacing position of said "I" core coil electromagnet and permanent magnets and act as supporting and pivoting point to allow rotational vibration.

7. An ultra low profile vibrating transducer according to claim 6, further comprising:
- at least a second "I" core electromagnet and corresponding permanent magnets adjacent to the end of said at least a second "I" core electromagnet; and
- a frame surrounding both said "I" core electromagnets and said permanent magnets and elastomeric supporting structure in order to substantially support static weight and to keep the weight from constricting vibration of said permanent magnets and said "I" core electromagnets.

8. An ultra low profile vibrating transducer according to claim 7, further comprising:
- a soft tissue-like foam placed on the under side of the I core electromagnets and/or the permanent magnets to float the magnets substantially to an upper surface such that higher energy is coupled to the upper side of the magnets and allows more space below the magnet such that minimum energy is coupled to the floor.

9. An ultra low profile vibrating transducer according to claim 8, further comprising upper and lower covers to shield the vibrator from moisture, dust and the environmental interference with protection from wear and tear.

10. An ultra low profile vibrating transducer, particularly suitable for a floor mat or pad, comprising:
- multiple sets of "I" core coil electromagnets, supported by elastomers to allow vibration up or down or rotation;
- a plurality of permanent magnets placed adjacent to each end of the "I" core electromagnets, with an air gap, wherein the permanent magnets have opposite poles at the upper and lower faces thereof;
- an elastomeric supporting structure to maintain lateral spacing position of said "I" core coil electromagnets and permanent magnets and act as supporting and pivoting point to allow rotational vibration;
- a frame surrounding both said "I" core electromagnets and said permanent magnets and elastomeric supporting structure in order to substantially support static weight and to keep the weight from constricting vibration of said permanent magnets and said "I" core electromagnets;
- a soft tissue-like foam placed on the under side of the I core electromagnets and/or the permanent magnets to float the magnets substantially to an upper surface such that higher energy is coupled to the upper side of the magnets and allows more space below the magnet such that minimum energy is coupled to the floor; wherein
- said permanent magnets placed at ends of said "I" core coil electro magnets are spaced laterally in line; and
- said permanent magnets and said "I" core coil electro magnets are cascading alternately in a lateral direction such that activation from adjacent "I" core coil electro magnets with opposing polarity creates rocking action of magnets, further creating truly balanced rotating vibrating action of magnets.

11. An ultra low profile vibrating transducer, particularly suitable for a floor mat or pad, comprising:
- an "I" core coil electromagnet having first and second ends, supported by elastomers to allow vibration up or down or rotation of the "I" core coil electromagnet;
- a plurality of electromagnets, placed adjacent to each end of the "I" core electromagnet, with air gap therebetween, wherein the plurality of electromagnets have opposite poles at the upper and lower faces, the plurality of electromagnets are supported by flexible elastomer which can act as supporting and pivoting point of the plurality of electromagnets to allow rotational vibration thereof; and
- a supporting structure to maintain lateral spacing position of the "I" core coil electromagnet and the plurality of electromagnets.

12. An ultra low profile vibrating transducer according to claim 11, further comprising:
- a weight bearing frame surrounding both the "I" core coil electro magnet and permanent magnets and elastomer in order to substantially support weight and to keep direct weight constricting vibration of said plural electro magnets and said "I" core coil electromagnet.

13. An ultra low profile vibrating transducer according to claim 12, further comprising:
- a soft tissue-like foam placed on an under side of the "I" core coil electromagnet and/or the plural electro magnets to float "I" core coil electromagnet and/or the plural electro magnets substantially to an upper surface such that higher energy is coupled to the upper side of the magnets and allows more space below the magnets such that minimum energy is coupled to a surface below the magnets.

14. An ultra low profile vibrating transducer according to claim 13, further comprising upper and lower covers to shield the vibrator from moisture, dust and the environmental interference with protect from wear and tear.

15. An ultra low profile vibrating transducer, particularly suitable for a floor mat or pad, comprising:

plural "I" core coil electromagnets having first and second ends, supported by elastomers to allow vibration up or down or rotation of the "I" core coil electromagnets;

a plurality of electromagnets, placed adjacent to each end of the "I" core electromagnets, with air gaps therebetween, wherein the plurality of electromagnets have opposite poles at the upper and lower faces, the plurality of electromagnets are supported by flexible elastomer which can act as supporting and pivoting point of the plurality of electromagnets to allow rotational vibration thereof; and a supporting structure to maintain lateral spacing position of the "I" core coil electromagnet and the plurality of electromagnets;

a weight bearing frame surrounding both the "I" core coil electro magnet and permanent magnets and elastomer in order to substantially support weight and to keep direct weight constricting vibration of said plural electro magnets and said "I" core coil electromagnet;

a soft tissue-like foam placed on an under side of the "I" core coil electromagnets and/or the plural electro magnets to float the "I" core coil electromagnet and/or the plural electro magnets substantially to an upper surface such that higher energy is coupled to the upper side of the magnets and allows more space below the magnets such that minimum energy is coupled to a surface below the magnets;

said plural electro magnets placed at ends of said "I" core coil electro magnets spaced laterally in line and cascading alternately in a lateral direction such that activation from adjacent "I" core coil electromagnets with opposing polarity creates rocking action, further creating truly balanced rotating vibrating action.

16. The apparatus according to claim 1, wherein said first magnet comprises an electromagnet.

17. The apparatus according to claim 1, wherein said second magnet comprises a permanent magnet.

18. The apparatus according to claim 1, wherein said second magnet comprises an electro magnet.

* * * * *